Patented Sept. 22, 1953

2,653,164

UNITED STATES PATENT OFFICE 2,653,164

PROCESS FOR PREPARING DERIVATIVES OF MARRIANOLIC ACID

Karl Miescher, Riehen, and Georg Anner, Basel, Switzerland, assignors to Ciba Pharmaceutical Products, Inc., Summit, N. J.

No Drawing. Application December 13, 1948, Serial No. 65,076. In Switzerland December 23, 1947

1 Claim. (Cl. 260—473)

The present invention is concerned with compounds—the so-called marrianolic acids and derivatives thereof—of the formula

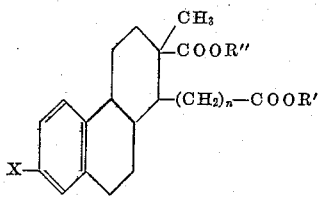

wherein X is a substituted hydroxyl group, preferably methoxy, R' and R'' each is a hydrogen atom or an alkyl group, and $n$ is one of the integers 1 and 2, more especially in the form of sterically unitary compounds, that is, in the form of the individual racemates or optically active antipodes.

The new compounds are valuable as intermediates for the production of other organic compounds. They are especially useful in the synthesis of oestrone and related compounds.

Since natural oestrone has been isolated and purified, unsuccessful attempts have repeatedly been made by various workers to make available the total synthesis of this hormone. These failures are ascribable to the complicated structure, particularly the presence of four asymmetric carbon atoms in the oestrone molecule. As is known, four asymmetric carbon atoms give rise to 8 racemates and 16 optical antipodes. In a synthesis wherein four asymmetric carbon atoms are formed, difficultly separable mixtures are to be expected from the start.

Litvan and Robinson (J. Chem. Soc. London 1938, page 1997) have, it is true, shown that the "natural" marrianolic acid, obtained by the oxidative decomposition of the five-membered ring of natural oestrone, can be built up again to oestrone. Attempts by way of total synthesis, without using decomposition products obtained from natural oestrone, to reach the goal have, however, hitherto not gone beyond the stage of the racemic marrianolic acids.

Thus, Bachmann, Kushner and Stevenson [Journal of the American Chemical Society, vol. 64, page 974 (1942)] reacted a hexahydro-ketoester having only one asymmetrical carbon atom, namely 1-oxo-2-methyl-7-methoxy-1,2,3,4,9,10-hexahydrophenanthrene-2-carboxylic acid methyl ester, with bromacetic acid methyl ester, split off water from the resulting hydroxy-ester, and then hydrogenated the newly formed double bond simultaneously with the double bond in the 11,12-position. From the oily racemate mixture so obtained they produced by further synthesis a crystalline cyclic ketone melting at 214° C., which, however, exhibited an oestrogenic action 250 times smaller than that of natural oestrone. Robinson and Walker (Journal of the Chemical Society, London, 1938, page 183), on the other hand, had previously reacted an octahydrocompound, namely 1-oxo-2-methyl-7-methoxy-1,2,3,4,9,10,11,12-octahydrophenanthrene - 2 - carboxylic acid ethyl ester, which they had obtained in the form of an oil, with bromacetic acid ethyl ester by the method of Reformatzky, hydrolyzed the resulting product, and attempted to split off water therefrom and to hydrogenate the resulting double bond. However, they were unable to obtain any marrianolic acid in this manner.

In view of this state of affairs, the total synthesis of oestrone has generally been given up in the art as an apparently unattainable goal. Thus, the situation is summed up by C. Velluz in his work "La Chimie des Hormones Stéroides dans ses Nouveaux Développements" (Bull. Soc. Chim. France, July-August 1947, 569) to the effect that it has been necessary to abandon the total synthesis of oestrone on account of unduly great difficulties.

The present invention is based on the observation that the aforesaid sterically unitary marrianolic acids and derivatives thereof can be obtained by reacting a sterically unitary 1-oxo-2-methyl-1,2,3,4,9,10,11,12-octahydrophenanthrene-2-carboxylic acid ester, which contains substituted hydroxyl group, e. g. methoxy, in 7-position, with a halogen acetic acid ester in the presence of a metal, dehydrating the so-obtained hydroxyl compound, hydrogenating the newly formed double bond, and if desired, treating the resulting product with a hydrolyzing agent, building up marrianolic acids into homomarrianolic acids, and separating sterically unitary compounds at any desired stage of the process.

The sterically unitary 1-oxo-2-methyl-1,2,3,4,9,10,11,12-octahydrophenanthrene - 2 - carboxylic acid esters, especially the methyl esters, used as starting materials contain in the 7-position an etherified hydroxyl group, for example, an alkoxy group, more especially a methoxy group, or an aralkoxy group such as a benzyloxy group, or an esterified hydroxyl group such as an acetoxy, propionoxy, benzoyloxy or succinyloxy group. They may also be brought into reaction in the form of the optically active compounds. Advantageously, for example, the racemate of 1-oxo-2-methyl-7-methoxy - 1,2,3,4,9,10,11,12-octohydrophenanthrene-2-carboxylic acid methyl ester melting at 133–135° C. is used as starting material.

The individual racemates can be obtained e. g. by fractional treatment, particularly by fractional crystallization from organic solvents [compare the publications of Anner and Miescher, Experientia 3, 279 (1947), Helv. Chim. Acta 30, 1422 (1947)] and the optically active isomers thereof by way of the reaction products with optically active alcohols or acids.

The reaction of the aforesaid starting materials with the halogen-acetic acid esters, such as chloro-, bromo- or iodo-acetic acid methyl, ethyl, propyl or phenyl ester, is carried out in the presence of a metal, which may be used in the form of an alloy, for example, in the presence of zinc, magnesium or a zinc-copper alloy. It is of advantage to work in a diluent, especially an inert organic solvent such as ether, benzene, toluene, xylene, dioxane or a mixture of these solvents.

In accordance with the invention the splitting off of water is carried out directly after the reaction of the keto-ester with the halogen acetic acid ester. Especially suitable as agents for splitting off water are, for example, the halides of phosphorus, above all phosphorus oxychloride, in organic bases such as pyridine or piperidine, and anhydrous oxalic acid in an anhydrous lower aliphatic acid such as formic acid, acetic acid or propionic acid. The hydrogenation of the aliphatic double bond formed by the splitting off of water is carried out for example by means of catalytically activated hydrogen.

The marrianolic acid derivatives coming within the scope of the present invention comprise also the homo-marrianolic acids, and these may be built up for example from the corresponding marrianolic acids by subjecting the latter to half-saponification, whereby the primary bound carboxyl group is hydrolyzed, the half-ester being then converted into the corresponding halide and diazo-ketone, the diazo-ketone subjected to the Arndt-Eistert reaction, and the obtained marrianolic acid hydrolyzed, if desired.

Separation of the obtained racemic products at any reaction stage into the individual racemates can be realized e. g. by fractional treatment, particularly by fractional crystallization from organic solvents. The individual racemates can then be resolved into the antipodes by way of the reaction products with optically active alcohols or acids. The process is described in greater detail in the following example, the relationship between parts by weight and parts by volume being the same as exists between the gram and cubic centimeter. The temperatures are given in degrees centigrade.

*Example 1*

A solution of 6 parts by weight of 1-oxo-2-methyl - 7 - methoxy - 1,2,3,4,9,10,11,12 - octahydrophenanthrene - 2 - carboxylic acid methyl ester melting at 133–135° and having the formula

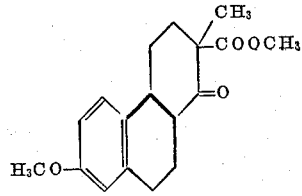

in 90 parts by volume of benzene and 90 parts by volume of ether is boiled, after the addition of 18 parts by weight of activated zinc, 0.6 part by weight of iodine and 6 parts by volume of brom-acetic acid methyl ester, for 16 hours in an atmosphere of nitrogen, while stirring. After cooling, dilute ice-cold acetic acid is added to the mixture, the pale colored benzene-ether solution is separated and extracted with dilute aqueous ammonia solution until the latter is no longer colored. After washing the benzene-ether solution with water and drying it, the organic solvent is evaporated and the residue is recrystallized from ethanol. The resulting 1 - hydroxy - 7-methyl-marrianolic acid dimethyl ester of the formula

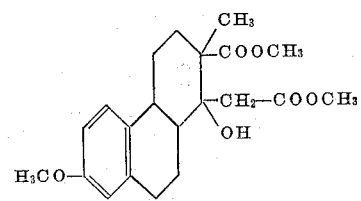

melts at 95–96° C. after further recrystallization from methanol.

For the purpose of splitting off water 10 parts by weight of the above ester melting at 95–96° are boiled in a mixture of 100 parts by volume of pyridine and 10 parts by volume of phosphorus oxychloride. After about 45 minutes the mixture is cooled, poured onto ice, an excess of hydrochloric acid is added thereto, and the precipitated reaction product is taken up in ether. The ethereal solution is washed with hydrochloric acid and water and then dried and evaporated, and the residue which crystallizes immediately is recrystallized from a mixture of acetone and methanol. There is chiefly obtained the unsaturated 7-methyl-marrianolic acid dimethyl ester melting at 113–115°. The isomeric ester obtained from the mother liquor melts at 89–91°.

The double bond formed by the splitting off of water may be saturated with hydrogen, for example, in the following manner:

1 part of the unsaturated 7-methyl-marrianolic acid dimethyl ester melting at 113–115° is agitated in an atmosphere of hydrogen at about 60°, in the presence of 0.1 part by weight of palladium black and 60 parts by volume of glacial acetic acid. When a quantity of hydrogen equivalent to 1 mol has been taken up the hydrogenation ceases. The glacial acetic acid solution is filtered to remove the catalyst therefrom and evaporated to leave behind a colorless oil, which partially crystallizes upon standing with methanol and after further recrystallization yields the pure racemic 7-methyl-marrianolic acid dimethyl ester melting at 95–96°. There is obtained from the oily mother liquor, after long standing in the cold, the isomeric ester which melts at 91–93° after repeated recrystallization from a mixture of ether and petroleum ether and produces a distinct melting point depression in admixture with the di-methyl ester melting at 95–96°. The two isomeric dimethyl esters can be converted, for example, by alkaline hydrolysis in a mixture of potassium hydroxide, alcohol and water at about 160° into the corresponding isomeric 7-methyl-marrianolic acids, from which the free marrianolic acids can be obtained by further hydrolysis, for example, by means of pyridine hydrochloride at about 180°. The racemic 7-methyl-marrianolic acid dimethyl ester melting at 95–96° can be built up into the homo-acid, for example, in the following manner:

6 parts by weight of the said dimethyl ester are boiled for 17 hours in a mixture of 500 parts by volume of methanol and 250 parts by volume of an aqueous 0.1 N-solution of potassium hydroxide in order to hydrolyze the carbomethoxy group of the acetic acid ester. The mixture is then diluted with a large quantity of water, extracted with ether, whereby traces of the starting material are recovered, and the alkaline solution is acidified. The racemic 7-methyl-marrianolic acid semi-ester, which precipitates in crystalline form, melts at 172–173° after recrystallization from a mixture of acetone and methanol. 1 part by weight of the semi-ester is converted into the acid chloride by suspending it in 10 parts by volume of benzene, and, after adding 1 part by volume of oxalyl chloride, allowing the whole to stand overnight at room temperature. By evaporating the solvent there is obtained the acid chloride which is dissolved in benzene without further purification and mixed with an ice-cold ethereal solution of diazo-methane. The yellow colored diazo-ketone, melting at 133–134°, which is obtained after evaporating the solvent is taken up in 50 parts by volume of methanol, and, after the addition of 2 parts by weight of freshly precipitated and dried silver hydroxide, the solution is boiled until nitrogen is no longer split off. The reaction product obtained from the filtered methanol solution is then heated in order to hydrolyze the two carbomethoxy groups in a mixture of 10 parts by volume of alcohol, 1 part by volume of water and 3 parts by weight of potassium hydroxide in an open vessel at 160–170°. The potassium salt which precipitates in solid form after the evaporation of the solvent, is taken up in water and the alkaline solution is acidified after extraction with ether. The acid which melts at 225–227° after recrystallization from methanol is racemic 7-methyl-homomarrianolic acid of the formula

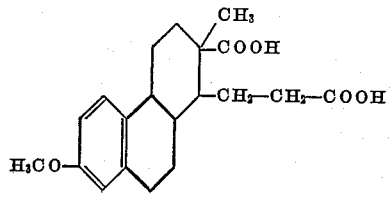

In an analogous manner the isomeric racemic 7-methyl-marrianolic acid dimethyl ester melting at 91–93° can be built up to form a further corresponding homo-acid, melting at 212–214°

What is claimed is:

In a process for the manufacture of racemic marrianolic acid, the steps of reacting 1-oxo-2-methyl-7-methoxy-1,2,3,4,9,10,11,12 - octahydrophenanthrene-2-carboxylic acid methyl ester melting at 133–135° C. with bromacetic acid ester at elevated temperature in the presence of zinc, splitting off water from the so-obtained hydroxy compound with phosphorus oxychloride, and hydrogenating the newly-formed double bond with the aid of a palladium catalyst in an atmosphere of hydrogen at about 60° C.

KARL MIESCHER.
GEORG ANNER.

References Cited in the file of this patent

Anner et al., Hel. Chim. Acta., vol. 30 (1947), pp. 1422–4.

Bachmann et al., J. A. C. S., vol. 62, pp. 595–598 (1940).

Bachmann et al., J. A. C. S., vol. 64, pp. 536–539 (1942).

Bachmann et al., J. A. C. S., vol. 64, pp. 974–981 (1942).

Bachmann et al., J. A. C. S., vol. 66, pp. 553–557 (1944).

Robinson et al., J. Chem. Soc., 1939, pp. 1394–1405.

Bardham, J. Chem. Soc., 1936, pp. 1848–1851.

Miescher, Helv. Chim. Acta., vol. 27, p. 1732 (1944).

Heer et al., Helv. Chim. Acta., vol. 29, p. 1895 (1946).

Dane et al., Annalen, vol. 532, p. 48 (1937).

Breitner, Chem. Zentr., 1943 I, p. 2684.